(12) United States Patent
Holleczek et al.

(10) Patent No.: US 11,619,711 B2
(45) Date of Patent: Apr. 4, 2023

(54) SCANNING SYSTEM AND TRANSMITTING AND RECEIVING DEVICE FOR A SCANNING SYSTEM

(71) Applicant: Robert Bosch GmbH, Stuttgart (DE)

(72) Inventors: Annemarie Holleczek, Stuttgart (DE); Benjamin Schmidt, Stuttgart (DE); Mirko Hattass, Stuttgart (DE); Remigius Has, Grafenau-Daetzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 530 days.

(21) Appl. No.: 16/642,211

(22) PCT Filed: Aug. 3, 2018

(86) PCT No.: PCT/EP2018/071127
§ 371 (c)(1),
(2) Date: Feb. 26, 2020

(87) PCT Pub. No.: WO2019/048148
PCT Pub. Date: Mar. 14, 2019

(65) Prior Publication Data
US 2020/0355802 A1 Nov. 12, 2020

(30) Foreign Application Priority Data
Sep. 6, 2017 (DE) ...................... 10 2017 215 671.6

(51) Int. Cl.
*G01C 3/08* (2006.01)
*G01S 7/481* (2006.01)
(Continued)

(52) U.S. Cl.
CPC .......... *G01S 7/4812* (2013.01); *G01S 7/4817* (2013.01); *G01S 17/931* (2020.01); *G01S 17/89* (2013.01)

(58) Field of Classification Search
None
See application file for complete search history.

(56) References Cited

U.S. PATENT DOCUMENTS 7,969,558 B2 6/2011 Hall
2015/0109604 A1* 4/2015 Masuda .................. G01S 17/42
356/4.07

FOREIGN PATENT DOCUMENTS

DE 10139237 A1 3/2003
DE 102006027063 A1 12/2007
(Continued)

OTHER PUBLICATIONS

International Search Report for PCT/EP2018/071127, dated Oct. 23, 2018.

*Primary Examiner* — Mark Hellner
(74) *Attorney, Agent, or Firm* — Norton Rose Fulbright US LLP; Gerard Messina

(57) ABSTRACT

A scanning-system including transmit/receive paths, a transmitter, a receiver and a rotating-scanning-device. The transmitter emits radiation which propagates along an optical-axis on the transmit-path. The radiation from the target-object is detected by the receiver on the receive-path. The rotating-scanning-device includes an optical-system and a rotating-deflection-unit, which deflects the radiation of the transmit/receive paths. The optical-system includes a first-focusing-unit and a rotating-second-focusing-unit. The movements of the rotating-deflection-unit and the rotating-second-focusing-unit occur synchronously to ensure an alignment of the deflected radiation with the second-focusing-unit. The first-focusing-unit reproduces the radiation (Continued)

emitted by the transmitter on the rotating-deflection-unit so that the beam-diameter on the rotating-deflection-unit is reduced. The rotating-deflection-unit deflects the radiation onto the rotating-second-focusing-unit and the rotating-second-focusing-unit collimates the radiation toward the target-object. The rotating-second-focusing-unit reproduces the radiation from the target-object on the rotating-deflection-unit so that the beam-diameter on the rotating-deflection-unit is reduced, and the rotating-deflection-unit deflects the received radiation toward the receiver.

14 Claims, 4 Drawing Sheets

(51) Int. Cl.
  *G01S 17/931*   (2020.01)
  *G01S 17/89*   (2020.01)

(56) References Cited

FOREIGN PATENT DOCUMENTS

| | | | | |
|---|---|---|---|---|
| DE | 102008013906 A1 | | 10/2009 | |
| DE | 102010047984 A1 | | 4/2012 | |
| DE | 202014101550 U1 | | 7/2015 | |
| JP | H07191142 A | | 7/1995 | |
| JP | 2009294036 | * | 12/2009 | ............... G01S 7/48 |
| JP | 2009294036 A | | 12/2009 | |
| KR | 20180108116 A | * | 3/2017 | ............. G01S 7/481 |

\* cited by examiner

SCANNING SYSTEM AND TRANSMITTING AND RECEIVING DEVICE FOR A SCANNING SYSTEM

FIELD OF THE INVENTION

The present invention relates to a scanning system, which includes transmit and receive paths, a transmitter, and a receiver and a rotating scanning device. The present invention furthermore relates to a transmitting device and a receiving device for such a scanning system.

BACKGROUND INFORMATION

Such scanning systems are believed to be from the related art, which may be used, for example, in automotive LIDAR systems, building scanning systems, or for detecting 3D geometries. They are based on a light beam being emitted to scan a target object and the light beam being reflected from the target object back to a receiver. It is possible, for example, to ascertain the distance of the target object in the observation area from the signal propagation time and the speed of light.

The scanning systems may be based on various principles and in particular may be implemented using movable components. One differentiation criterion in the configuration of the scanning system is whether transmitting and receiving units are attached movably or fixed at a position. Theoretically, an angle range of 360° may be covered using a movable transmitting and receiving unit, however, it is disadvantageous that a wireless energy and data transmission has to take place via the rotating transmitting and receiving unit and this restricts the bandwidth of the data transmission. Moreover, such a configuration may have a negative effect on the thermal management in the measuring head. Such a scanning system is discussed in U.S. Pat. No. 7,969,558 B2.

In contrast, if transmitting and receiving units are statically mounted, scanning of a target object may thus be implemented with the aid of a beam emitted by a transmitter via a rotating optical element, for example, one or multiple mirror(s), as discussed in DE 10 2010 047 984 A1. This rotating optical element enables the scanning within a defined angle range, which is restricted, however, by the diameter and the length of the rotating element. For a glancing incidence of the transmission or reception radiation on the rotating element, this element has to be selected to be relatively large in diameter and length. Particularly for deflection angles close to 180°, increasing size of the rotating element is to be expected, since the size or the diameter of the rotating element is dependent on the deflection angle and the beam diameter. For example, at a beam diameter of 10 mm and a maximum deflection angle of 140°, a diameter of the rotating element of nearly 30 mm results via 10 mm/cos (140°/2)=29.8 mm. For a deflection angle of 160°, the theoretically computed diameter would correspond to 57.6 mm, i.e., almost twice the considered first sample calculation.

If the diameter of the rotating element is selected to be excessively small, in certain circumstances this may thus result in a signal loss and incomplete deflection of the beam. This would also have a negative effect on the range of the scanning system. If the transmission beam is conducted back directly to the transmitting and receiving unit, in this specific embodiment—due to the static mounting of the transmitting and receiving units—shadowing effects moreover have to be expected. However, it is advantageous that the data and energy transmission between the transmitting unit and the receiving unit may be carried out in simple wiring, and the thermal connection of the transmitter, for example, a pulsed or continuous-wave laser, which emits electromagnetic radiation in the infrared range, is thus more easily implementable.

SUMMARY OF THE INVENTION

An object of the present invention is to refine a scanning system in such a way that a space-saving construction is enabled and a larger usable scanning angle range is achieved at the same time.

This object may be achieved by a scanning system according to the description herein, a transmitting device for a scanning system according to the description herein, and a receiving device for a scanning system according to the description herein. Further advantageous specific embodiments of the present invention are described in the further descriptions herein.

According to the present invention, a scanning system is provided which includes a transmit path and a receive path having a transmitter and a receiver and a rotating scanning device. The transmitter sends radiation which propagates along an optical axis on the transmit path toward the target object. The radiation received from the target object is detected by the receiver on the receive path. In addition, the rotating scanning device includes an optical system and a rotating deflection unit which deflects the radiation of the transmit and receive paths. It is provided that the optical system includes a first focusing unit and a rotating second focusing unit. The movements of the rotating deflection unit and the rotating second focusing unit take place synchronously to ensure an alignment of the deflected radiation with the second focusing unit. Furthermore, the first focusing unit reproduces the radiation emitted by the transmitter on the rotating deflection unit in such a way that the beam diameter on the rotating deflection unit is reduced. The rotating deflection unit deflects the emitted radiation onto the rotating second focusing unit, this second focusing unit collimating the radiation toward the target object. Similarly, the rotating second focusing unit reproduces the radiation received from the target object on the rotating deflection unit in such a way that the beam diameter on the rotating deflection unit is reduced. The rotating deflection unit deflects the received radiation toward the receiver.

The focusing of the emitted beam received from the target object on the rotating deflection unit enables a reduction in size of the beam diameter. The required diameter of the rotating deflection unit is thus reduced and a more compact construction of the scanning system is enabled. In purely mathematical terms, a rotating deflection unit having a diameter of only 1 mm would then be usable for deflection angles up to approximately 179°. The achievement of the object according to the present invention shows that, on the one hand, the usable angle range of the scanning system is enlarged and, on the other hand, a smaller deflection unit may be used for this purpose. It is furthermore advantageous that the scanning may take place not only horizontally in one plane with the aid of the rotating deflection unit, but rather also vertically, thus making 3D geometries scannable.

According to one specific embodiment, the transmit path and the receive path coincide in a second beam path between the rotating deflection unit and the rotating second focusing unit. Furthermore, the rotating second focusing unit includes a converging lens, which collimates the emitted radiation toward the target object and focuses the radiation received from the target object on the rotating deflection unit.

This configuration has the advantage that the converging lens is used as an output and receiving lens for the radiation and thus a further optical element is not required for focusing the received radiation.

It may be provided that the transmit path and the receive path between the rotating deflection unit and the rotating second focusing unit are decoupled in a fifth beam path. Furthermore, the rotating second focusing unit includes two converging lenses. The first converging lens is located in the transmit path and the second converging lens in the receive path.

Due to the decoupling of the two paths between the rotating deflection unit and the rotating second focusing unit, the susceptibility of the scanning system to crosstalk between the signals is reduced. This increases the reliability of the system.

It may be provided that the rotating deflection unit is made up of two elements. The first element of the rotating deflection unit is located in the transmit path and the second element in the receive path.

It may be provided that the transmitter and the receiver are situated perpendicularly to one another. Furthermore, a beam splitter is provided for decoupling the transmit path and the receive path between the rotating deflection unit and the transmitter and the receiver.

The spatial separation of the transmitter and the receiver has a positive effect on possibly occurring shadowing effects and contributes to the stability of the system. If the received beam were deflected directly back onto the transmitter, it would be possible that this would cause instabilities if a part of the radiation were incident on the output of the transmitter. Due to the movement of the rotating deflection unit, it is moreover not ensured that the radiation is actually incident on a detection section at the transmitter. It is possible that it reaches the housing (shadowing). Due to the use of the beam splitter, transmitter and receiver may be aligned with one another with little effort.

It may be provided that the first focusing unit includes two converging lenses. The first converging lens is situated in the transmit path and the second converging lens in the receive path. Furthermore, it is provided that the converging lens in the receive path focuses the radiation received from the target object on the receiver.

The beam diameter is reduced due to the focusing. Fewer shadowing effects and less signal loss thus occur at the receiver. In the transmit path, the focusing of the emitted radiation on the rotating deflection unit permits the use of a deflection unit having a reduced diameter. Moreover, the focusing offers the option of working in a deflection angle range of nearly 180°, and to do so with the use of the same optical components and unchanged rotating deflection unit.

It may be provided that the synchronization of the movements of the rotating deflection unit and the rotating second focusing unit is carried out mechanically and/or by control technology by a coupling unit.

The type of the synchronization advantageously permits the two rotational velocities to be adapted to one another without requiring a manual intervention.

It may be provided that the rotating deflection unit rotates at an angular velocity $\Omega_1$. The rotating second focusing unit of the optical system is furthermore seated in a rotating frame, which moves at an angular velocity $\Omega_2=2\Omega_1$.

Since the deflection angle after the rotating deflection unit corresponds to twice the tilt angle of the deflection unit, the angular velocities of the two rotating elements have to have the relationship $\Omega_2=2\Omega_1$. The angular velocity of the rotating second focusing unit is twice as large as the angular velocity of the rotating deflection unit. A correct alignment of the radiation deflected by the deflection unit to the rotating second focusing unit may therefore be ensured by the adaptation of the angular velocities.

It may be provided that the transmitting device for a scanning system includes a transmit path including a transmitter and a rotating scanning device. The transmitter emits radiation which propagates along an optical axis and the rotating scanning device includes an optical system and a rotating deflection unit. The rotating deflection unit of the scanning device deflects the emitted radiation. Furthermore, it is provided that the optical system includes a first focusing unit and a rotating second focusing unit. The movements of the rotating deflection unit and the rotating second focusing unit take place synchronously to ensure an alignment of the deflected radiation with the second focusing unit. Furthermore, the first focusing unit reproduces the radiation emitted by the transmitter on the rotating deflection unit in such a way that the beam diameter on the rotating deflection unit is reduced. The rotating deflection unit deflects the emitted radiation onto the rotating second focusing unit, while the rotating second focusing unit collimates the radiation toward the target object and thus reduces the beam divergence of the radiation deflected by the rotating deflection unit.

It may be provided that the receiving device for a scanning system includes a receive path including a receiver and a rotating scanning device. The receiver detects the radiation received from the target object on the receive path and the rotating scanning device includes an optical system and a rotating deflection unit. Furthermore, it is provided that the received radiation is deflected by the rotating deflection unit of the scanning device and the optical system includes a first focusing unit and a rotating second focusing unit. The movements of the rotating deflection unit and the rotating second focusing unit take place synchronously to ensure an alignment of the deflected radiation with the second focusing unit. Furthermore, the rotating second focusing unit reproduces the radiation received from the target object on the rotating deflection unit in such a way that the beam diameter is reduced and the rotating deflection unit deflects the radiation received from the target object and conducts it to the receiver.

The above-described properties, features, and advantages of the present invention and the way in which they are achieved will become clearer and more comprehensible in conjunction with the following description of exemplary embodiments, which are explained in greater detail in conjunction with the drawings.

DETAILED DESCRIPTION

Specific embodiments of a scanning system are described on the basis of the following figures, using which 3D geometries may be scanned. The concept of the system described here may be used, for example, in automotive LIDAR systems or in building scanning systems. Such systems are based on a light beam being emitted to scan a target object, and the light beam being reflected from the target object back to a receiver. It is additionally possible to ascertain the distance of the target object in the observation area from the signal propagation time and the speed of light.

Figure 1:
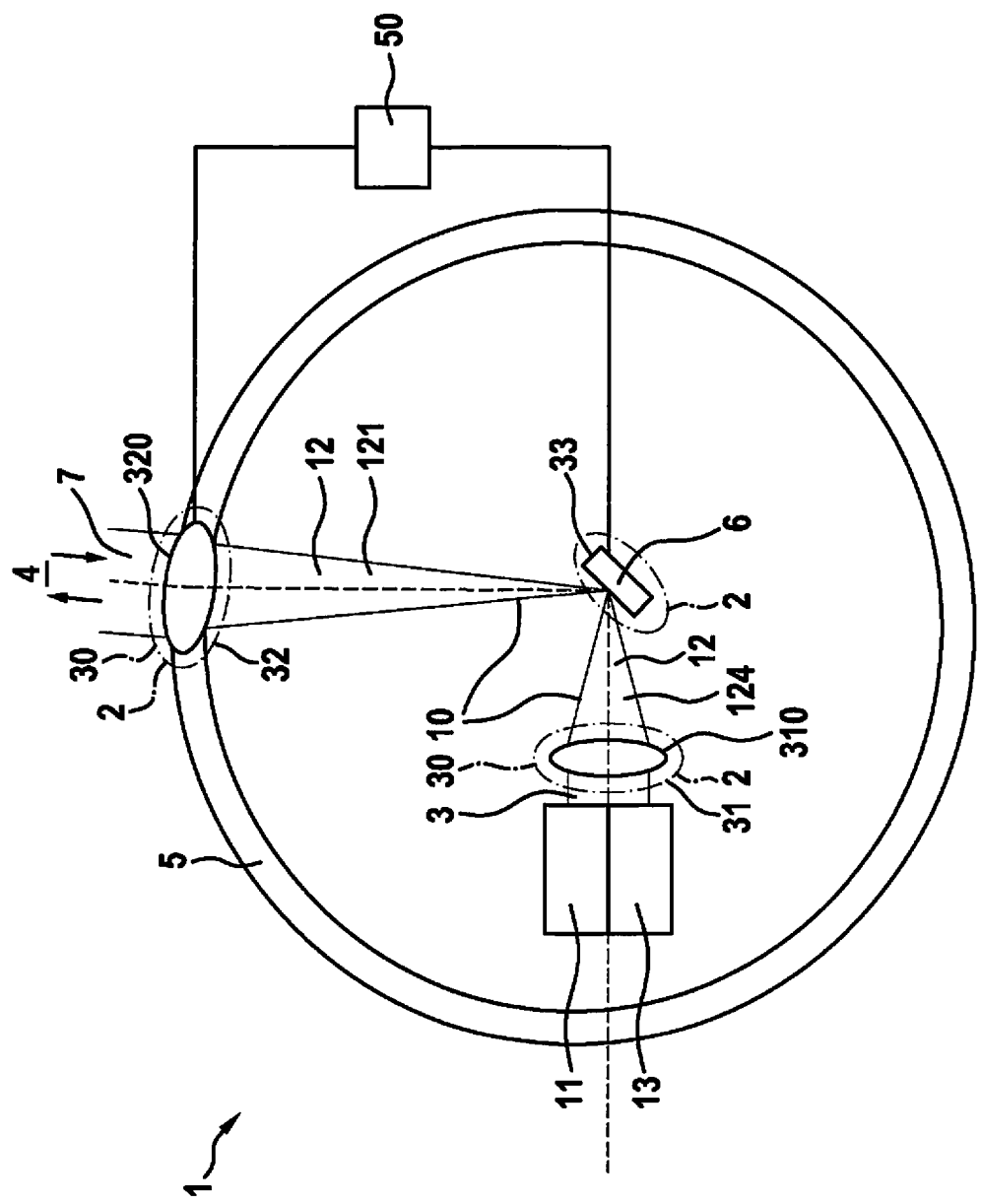
FIG. 1 shows a schematic top view of a scanning system, which includes a transmit and receive path including a transmitter and receiver and a rotating scanning device.

FIG. 1 shows a first specific embodiment of a scanning system 1. Scanning system 1 includes a transmitter 11, a receiver 13, and a rotating scanning device 2. Rotating scanning device 2 includes an optical system 30 and a rotating deflection unit 33. Furthermore, optical system 30 includes a first focusing unit 31 including a first converging lens 310 and a rotating second focusing unit 32 including a first converging lens 320. The rotating second focusing unit is attached in a rotating frame 5.

Transmitter 11, for example, a pulsed laser and/or a laser which operates in the continuous wave mode and/or an alternative light source, etc., emits radiation 3, for example, in the infrared range and/or UV range, etc., which propagates along an optical axis on a transmit path 10. Emitted radiation 3 is focused by first converging lens 310 of first focusing unit 31 onto rotating deflection unit 33. Rotating deflection unit 33 is rotatably attached around a rotational axis 6, which protrudes out of the plane of the drawing. Due to the focusing of emitted radiation 3 with the aid of first converging lens 310, it is possible to reduce the beam diameter of emitted radiation 3 on rotating deflection unit 33. A smaller beam diameter on rotating deflection unit 33 permits rotating deflection unit 33 to be adapted to have a smaller diameter, and thus installation space to be saved. Rotating deflection unit 33, for example, a mirror which is manufactured to be planar and/or a mirror which has a different structural form, and/or a prism, and/or an alternative diffractive optical element, etc., deflects emitted radiation 3 toward rotating second focusing unit 32 including first converging lens 320. Emitted radiation 3 is collimated toward target object 4 using converging lens 320. Due to the deflection between rotating deflection unit 33 and converging lens 320, emitted radiation 3 diverges significantly in this area. The divergence is undesirable, since the emitted power is distributed onto a very large solid angle. Converging lens 320 reduces the divergence of emitted radiation 3.

The movements of rotating deflection unit 33 and rotating second focusing unit 32 including converging lens 320 may be synchronized via a coupling unit 50 to be able to align emitted radiation 3 correctly in relation to converging lens 320 at every point in time. Converging lens 320 may be carried along with the movement of rotating deflection unit 33. Since the deflection angle after rotating deflection unit 33 corresponds to twice the tilt angle of rotating deflection unit 33, the rotational velocity of converging lens 320 has to correspond to twice the rotational velocity of rotating deflection unit 33. The synchronization of these two movements takes place mechanically and/or by control technology via coupling unit 50.

Transmit and receive paths 10, 12 coincide in the illustrated specific embodiment according to FIG. 1 between first focusing unit 31 and the rotating deflection unit and form a first beam path 124. Transmit and receive paths 10, 12 also coincide between rotating deflection unit 33 and rotating second focusing unit 32 and form a second beam path 121. Radiation 7 received from target object 4 is incident in receive path 12 on converging lens 320 and is focused thereby onto rotating deflection unit 33. Rotating deflection unit 33 deflects received radiation 7 toward converging lens 310 of first focusing unit 31 and this unit possibly focuses the received radiation (not explicitly shown in the illustration) onto receiver 13. Receiver 13 may be, for example, an avalanche photodiode (APD), a single-photon avalanche diode (SPAD), and/or a photomultiplier, and/or a CCD sensor, and/or an alternative photosensitive component with time resolution.

As an alternative to the use of converging lenses, any optical element would be conceivable which is capable of focusing or collimating radiation.

Transmitter 11 and receiver 13 are integrated into one unit in the specific embodiment shown. Alternatively, a spatial separation of transmitter 11 and receiver 13 would also be conceivable, which is not shown in the figure, however.

The scanning method is independent of the vertical structure of the transmission beam. For example, this may be a vertical line which is emitted in a single pulse and/or multiple points arranged one over another, which are emitted at different times under certain circumstances. The use of multiple transmitter and receiver modules adjacent to one another and/or one over another is therefore also conceivable. The modules generate additional radiation 3 to enlarge the vertical scanning range.

Radiation 3 emitted by the modules is focused via one and/or multiple converging lenses onto rotating deflection unit 33. Rotating deflection unit 33 deflects the emitted radiation toward the one and/or multiple converging lens(es), which are coupled to the movement of rotating deflection unit 33, and these collimate the emitted radiation toward target object 4. Radiation 7 received from target object 4 is focused by one and/or multiple converging lens(es), which are coupled to the movement of rotating deflection unit 33, onto rotating deflection unit 33. Rotating deflection unit 33 possibly deflects received radiation 7 toward one and/or multiple converging lens(es), which focus received radiation 7 onto the receiving modules.

Figure 2:
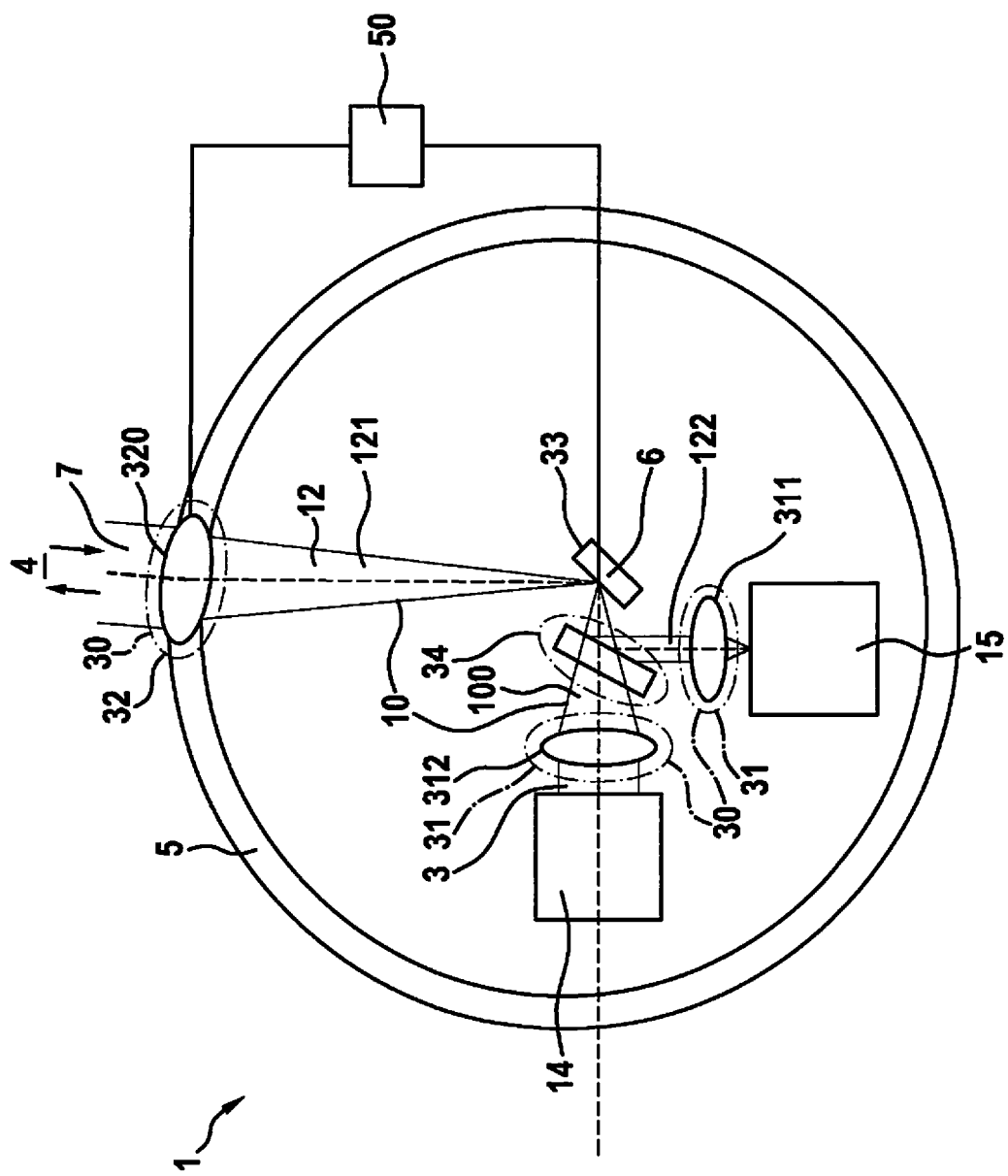
FIG. 2 shows a schematic top view of a scanning system including spatially separated transmitter and receiver, the decoupling of the transmit path and the receive path between the rotating deflection unit and the transmitter and the receiver being carried out using a beam splitter.

FIG. 2 shows another specific embodiment of a scanning system 1 including spatially separated transmitter 14 and receiver 15. The structure of scanning system 1 in the figure shown is similar to the structure of the scanning system in FIG. 1. The reference numerals in FIG. 2 are selected unchanged from the reference numerals of FIG. 1 if they refer to identically formed components. Only the features of FIG. 2 which differ from the features in FIG. 1 are explained hereafter.

In the specific embodiment according to FIG. 2, transmitter 14 and receiver 15 are situated perpendicularly in relation to one another. In a third beam path 100 between first converging lens 312 of first focusing unit 31 and rotating deflection unit 33, a beam splitter 34 is located, for example, having an allocation of the intensity 50:50, and/or having an alternative intensity allocation, and/or an alternative diffractive optical element thereto, etc. Beam splitter 34 is used to decouple transmit path 10 from receive path 12, after the return route of radiation 7 received from target object 4 via rotating deflection unit 33.

In third beam path 100, only the portion transmitted by beam splitter 34 of radiation 3 emitted by transmitter 14 is focused by converging lens 312 onto rotating deflection unit 33. Rotating deflection unit 33 deflects emitted radiation 3 onto converging lens 320 of rotating second focusing unit 32, converging lens 320 collimating emitted radiation 3 toward target object 4. Radiation 7 received from target object 4 is focused by converging lens 320 onto rotating deflection unit 33. Received radiation 7 is deflected onto beam splitter 34 using rotating deflection unit 33. Beam splitter 34 reflects received radiation 7 onto a second converging lens 311 of first focusing unit 31, and thus decouples receive path 12 from transmit path 10 in a fourth beam path 122. Converging lens 311 focuses received radiation 7 onto receiver 15.

Transmitter 14 and receiver 15 are spatially separated from one another by the decoupling. This contributes to reducing the susceptibility of scanning system 1 to crosstalk.

Alternatively to the illustrated specific embodiment, converging lens 311 before receiver 15 in fourth beam path 122 may be omitted. Received radiation 7 reaches receiver 15 directly without focusing. A further conceivable specific embodiment which decouples transmitter 14 and receiver 15 from one another is to implement rotating deflection unit 33, for example, as a beam splitter having an intensity allocation of 50:50 and to remove beam splitter 34 from third beam path 100 between converging lens 312 and rotating element 33. Rotating deflection unit 33 reflects, on the one hand, radiation 3 emitted by transmitter 14 toward target object 4—with prior focusing of radiation 3 by converging lens 312 onto rotating deflection unit 33 and subsequent collimation of radiation 3 using converging lens 320—and radiation 7 received from target object 4 passes, on the other hand, rotating deflection unit 33 and may be focused with the aid of converging lens 311 onto receiver 15.

Figure 3:
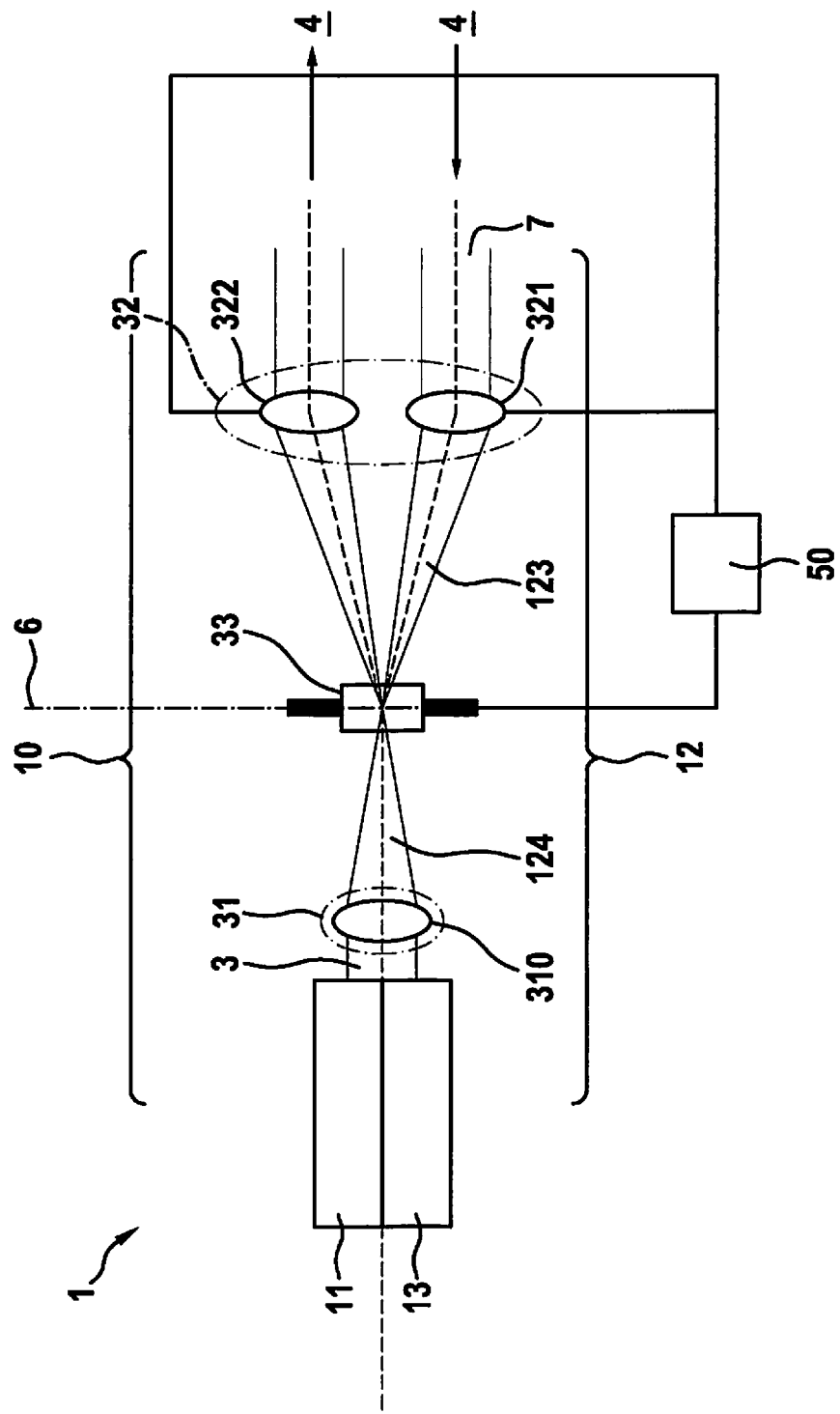
FIG. 3 shows a schematic perspective view of a scanning system having decoupled transmit and receive paths between the rotating deflection unit and the rotating second focusing unit.

FIG. 3 shows another specific embodiment of a scanning system 1 including decoupled transmit and receive paths 10, 12 between rotating deflection unit 33 and rotating second focusing unit 32. The structure of scanning system 1 in the image shown is similar to the structure of the scanning system in FIG. 1. The reference numerals in FIG. 3 are selected unchanged from the reference numerals of FIG. 1 if they refer to identically formed components. Only the features of FIG. 3 which differ from the features in FIG. 1 are explained hereafter.

As shown in FIG. 3, rotating second focusing unit 32 includes a first converging lens 322, which is located in transmit path 10 and collimates radiation 3 emitted by transmitter 11 toward target object 4. Furthermore, rotating second focusing unit 32 includes a second converging lens 321, which is located in receive path 12 and focuses radiation 7 received from target object 4 offset from emitted radiation 3 onto rotating deflection unit 33. Converging lens 321 and rotating deflection unit 33 form a fifth beam path 123. Second converging lens 321 of rotating second focusing unit 32 is attached vertically above and/or below first converging lens 322 to enable a separation of transmit and receive paths 10, 12 via fifth beam path 123. Second converging lens 321 is also located in the rotating frame (not included in the drawing) and may be carried along via coupling unit 50 with rotating deflection unit 33 and first lens 322.

After rotating deflection unit 33, receive path 12 coincides again with transmit path 10 to form first beam path 124. In the illustrated specific embodiment, renewed focusing of received radiation 7 by converging lens 310 onto receiver 13 is not shown.

In this specific embodiment, an alternative arrangement between transmitter 11 and receiver 13 would also be conceivable. As shown in the specific embodiment according to FIG. 3, transmitter 11 and receiver 13 form an integrated unit. A spatial separation of transmitter 11 and receiver 13 would be conceivable, for example, by using a beam splitter, for example, having an intensity allocation of 50:50 between converging lens 310 and rotating deflection unit 33—similarly to the specific embodiment according to FIG. 2. Radiation 7 received from target object 4 may be focused on fifth beam path 123, which is decoupled from transmit path 10, onto rotating deflection unit 33 and reflected toward the beam splitter. Focusing of received radiation 7 may optionally also be carried out with the aid of a converging lens onto spatially separated receiver 13.

Figure 4:
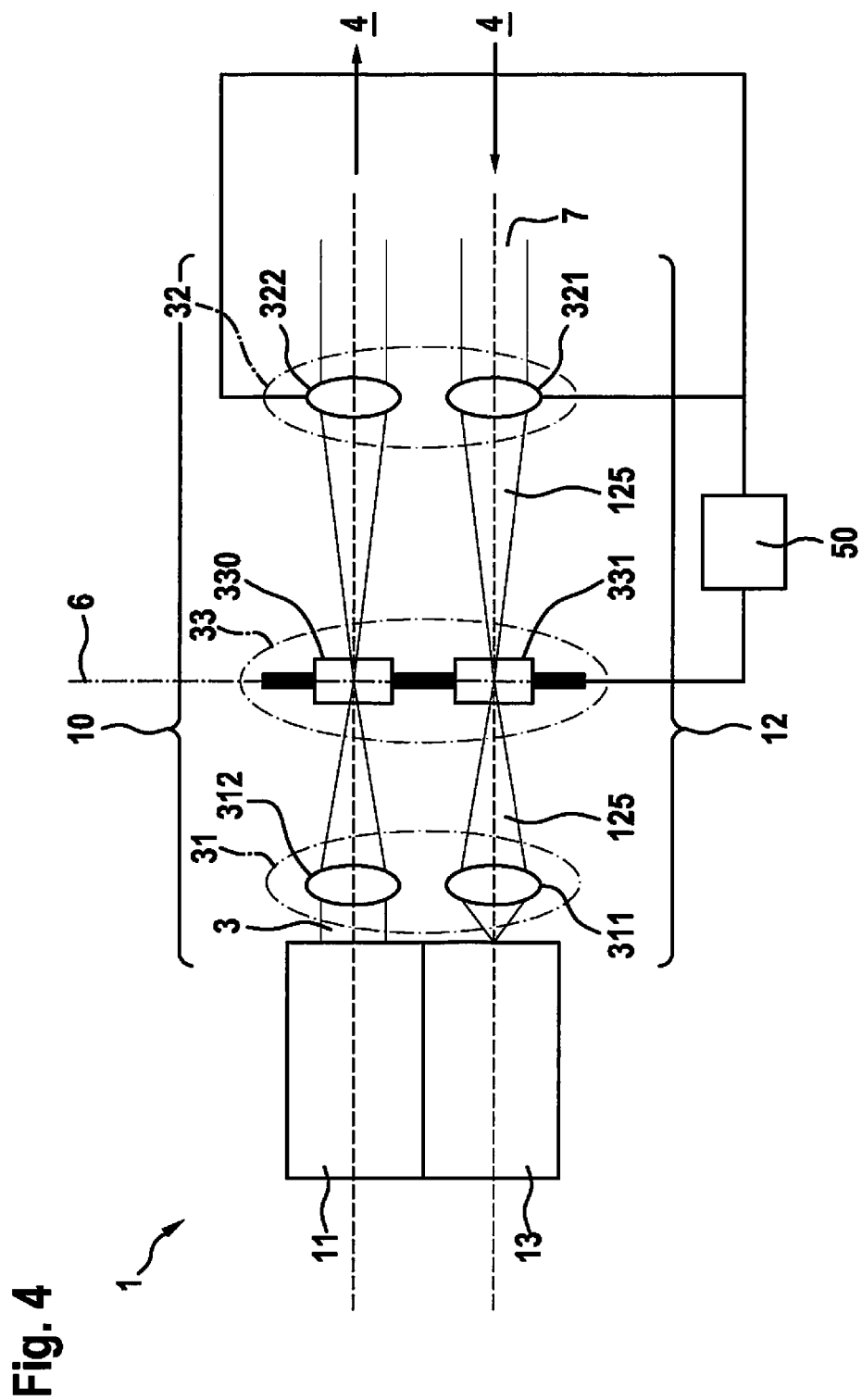
FIG. 4 shows a schematic perspective view of a scanning system including completely decoupled transmit and receive paths by way of the use of a second element of the rotating deflection unit.

Another specific embodiment, which is shown in the schematic perspective view in FIG. 4, shows a scanning system 1 including completely decoupled transmit and receive paths 10, 12. The structure of scanning system 1 in the image shown is similar to the structure of the scanning system in FIG. 1. The reference numerals in FIG. 4 are selected unchanged from the reference numerals of FIG. 1 when they refer to identically formed components. Only the features of FIG. 4 which differ from the features in FIG. 1 are explained hereafter.

As shown in FIG. 4, rotating deflection unit 33 includes a first element 330, which is located in transmit path 10, and a second element 331, which is located in receive path 12. For example, first element 330 of rotating deflection unit 33 may be a first mirror, which is manufactured to be planar, and/or a first mirror which has a different structural form, and/or a first prism, and/or a first alternative diffractive optical element, etc. Second element 331 of rotating deflection unit 33 may be a second mirror, which is manufactured to be planar, and/or a second mirror which has a different structural form, and/or a second prism, and/or a second alternative diffractive optical element. Second element 331 is attached on rotational axis 6 of first element 330 vertically above and/or below first element 330 and is synchronizable via coupling unit 50 with the movement of rotating second focusing unit 32.

Radiation 7 received from target object 4 is focused by converging lens 321 onto second element 331 of rotating deflection unit 33, and this unit deflects received radiation 7 toward second converging lens 311 of first focusing unit 31. Converging lens 311 focuses received radiation 7 onto receiver 13. Receive path 12 is thus completely optically decoupled from transmit path 10 in a sixth beam path 125, since emitted radiation 3 of transmit path 10 propagates toward target object 4 via converging lens 312 of first focusing unit 31, first element 330 of rotating deflection unit 33, and converging lens 322 of rotating second focusing unit 32, and received radiation 7 takes a sixth beam path 125 separate therefrom on receive path 12.

Alternatively to the illustrated specific embodiment, converging lens 311 before receiver 13 in decoupled receive path 12 may be omitted. Received radiation 7 reaches receiver 13 directly without focusing. Due to the complete decoupling of transmit and receive paths 10, 12, it would moreover be conceivable to situate transmitter 11 and receiver 13 spatially separated from one another. The rotating frame in which rotating second focusing unit 32 is located is not shown in the specific embodiment.

Although the present invention was illustrated and described in greater detail by the exemplary embodiments, the present invention is not thus restricted by the described examples and other variants may be derived therefrom by those skilled in the art without departing from the scope of protection of the present invention.

What is claimed is:

1. A scanning system, comprising:
a transmitter;
a receiver; and
a rotating scanning device, wherein there is a transmit path and a receive path;
wherein the transmitter is configured to emit radiation which propagates along an optical axis on the transmit path,
wherein the radiation received from the target object is detected by the receiver on the receive path,
wherein the rotating scanning device includes an optical system and a rotating deflection unit,
wherein the rotating deflection unit of the scanning device is configured to deflect the radiation of the transmit path and the receive path,
wherein the optical system includes a first focusing unit and a rotating second focusing unit,
wherein the movements of the rotating deflection unit and the rotating second focusing unit take place synchronously to ensure an alignment of the deflected radiation with the second focusing unit,
wherein the first focusing unit is configured to reproduce the radiation emitted by the transmitter on the rotating deflection unit while reducing a beam diameter of the emitted radiation from the transmitter onto the rotating deflection unit,
wherein the rotating deflection unit is configured to deflect the radiation onto the rotating second focusing unit,
wherein the rotating second focusing unit is configured to collimate the radiation toward the target object,
wherein the rotating second focusing unit is configured to reproduce the radiation received from the target object on the rotating deflection unit so that the beam diameter on the rotating deflection unit is reduced, and
wherein the rotating deflection unit is configured to deflect the received radiation toward the receiver.

2. The scanning system of claim 1, wherein the transmit path and the receive path coincide between the rotating deflection unit and the rotating second focusing unit in a first beam path, and wherein the rotating second focusing unit includes a converging lens, which is configured to collimate the emitted radiation toward the target object and focus the radiation received from the target object onto the rotating deflection unit.

3. The scanning system of claim 1, wherein the transmit path and the receive path are decoupled between the rotating deflection unit and the rotating second focusing unit, wherein the rotating second focusing unit includes two converging lenses, and wherein the first converging lens is located in the transmit path and the second converging lens is located in the receive path.

4. The scanning system of claim 3, wherein the rotating deflection unit is made up of two elements, and wherein the first element of the rotating deflection unit is located in the transmit path and the second element is located in the receive path.

5. The scanning system of claim 1, wherein the transmitter and the receiver are situated perpendicularly in relation to one another, further comprising:
a beam splitter to decouple the transmit path and the receive path between the rotating deflection unit and the transmitter and the receiver.

6. The scanning system of claim 1, wherein the first focusing unit includes two converging lenses, wherein the first converging lens is situated in the transmit path and the second converging lens is situated in the receive path, and wherein the converging lens in the receive path focuses the radiation received from the target object onto the receiver.

7. The scanning system of claim 1, wherein the synchronization of the movements of the rotating deflection unit and the rotating second focusing unit are carried out mechanically and/or by control technology by a coupling unit.

8. The scanning system of claim 1, wherein the rotating deflection unit is configured to rotate at an angular velocity $\Omega_1$, and wherein the rotating second focusing unit of the optical system is seated in a rotating frame, which moves at an angular velocity $\Omega_2=2\Omega_1$.

9. A transmitting device for a scanning system, comprising:
a transmitter; and
a rotating scanning device, wherein there is a transmit path;
wherein the transmitter is configured to emit radiation which propagates along an optical axis,
wherein the rotating scanning device includes an optical system and a rotating deflection unit, the rotating deflection unit of the scanning device being configured to deflect the radiation,
wherein the optical system includes a first focusing unit and a rotating second focusing unit,
wherein movements of the rotating deflection unit and the rotating second focusing unit take place synchronously to ensure an alignment of the deflected radiation with the second focusing unit,
wherein the first focusing unit is configured to reproduce the radiation emitted by the transmitter on the rotating deflection unit while reducing a beam diameter of the emitted radiation from the transmitter onto the rotating deflection unit,
wherein the rotating deflection unit is configured to deflect the radiation onto the rotating second focusing unit, and
wherein the rotating second focusing unit is configured to collimate the radiation toward the target object so as to reduce the beam divergence of the radiation deflected by the rotating deflection unit.

10. A receiving device for a scanning system, comprising:
a receiver; and
a rotating scanning device, wherein there is a receive path;
wherein the receiver is configured to detect the radiation received from the target object on the receive path,
wherein the rotating scanning device includes an optical system and a rotating deflection unit,
wherein the radiation is deflected by the rotating deflection unit of the scanning device,
wherein the optical system includes a first focusing unit and a rotating second focusing unit,
wherein the movements of the rotating deflection unit and the rotating second focusing unit take place synchronously to ensure an alignment of the deflected radiation with the second focusing unit,
wherein the rotating second focusing unit is configured to reproduce the radiation received from the target object on the rotating deflection unit so that the beam diameter is reduced,
wherein the rotating deflection unit is configured to deflect the radiation received from the target object and conduct it to the receiver, and wherein at least one of the following:

the rotating deflection unit is configured to perform the deflection and conduction of the radiation received from the target object so that a beam diameter of the conducted radiation is expanded from the rotating deflection unit onto the first focusing unit; and the first focusing unit includes two converging lenses in different respective optical paths, one of the paths being the receive path, and one of the converging lenses focusing the radiation received from the target object onto the receiver.

11. The receiving device of claim 10, wherein the rotating deflection unit is configured to perform the deflection and conduction of the radiation received from the target object so that the beam diameter of the of the conducted radiation is expanded from the rotating deflection unit onto the first focusing unit.

12. The receiving device of claim 10, wherein the first focusing unit includes the two converging lenses in the different respective optical paths, one of the converging lenses focusing the radiation received from the target object onto the receiver.

13. The receiving device of claim 12, wherein the different optical paths include a transmit path and the receive path, the one of the converging lenses being in the receive path.

14. The scanning system of claim 1, wherein:

the rotating second focusing unit includes a first converging lens and a second converging lens;

the transmit path is a first optical path and is decoupled from a second optical path between the rotating deflection unit and the rotating second focusing unit; and the first converging lens is located in the transmit path and the second converging lens is located in the second optical path.

* * * * *